(No Model.)

E. E. HORTON.
TIRE.

No. 534,606. Patented Feb. 19, 1895.

Witnesses
J. E. Camun
L. Foulds

Inventor
E. E. Horton
by Chas. H. Ricks
his Attorney

UNITED STATES PATENT OFFICE.

EDWARD E. HORTON, OF TORONTO, CANADA.

TIRE.

SPECIFICATION forming part of Letters Patent No. 534,606, dated February 19, 1895.

Application filed November 14, 1894. Serial No. 528,712. (No model.)

*To all whom it may concern:*

Be it known that I, EDWARD E. HORTON, of the city of Toronto, in the county of York and Province of Ontario, Canada, have invented certain new and useful Improvements in Tires; and I hereby declare that the following is a full, clear, and exact description of the same.

This invention relates to certain new and useful improvements in tires for all classes of wheels used either for cycles or other vehicles or conveyances, and relates more particularly to a tire which will not depend for its efficiency or resiliency upon air pressure within it, and the objects of the invention are to produce a tire which easily yields to the inequalities of the surface over which it is traveling and which will sharply return to its normal state after the inequalities are traversed, and also to so construct a tire and secure it in place that the side roll or movement of the tire will be substantially completely obviated; and the invention consists essentially of a tire comprised of a series of detached independent coils of flat spring steel connected to the rim of the wheel at regular intervals, and a tread band connected to the outer side of each coil of the series and located diametrically opposite the rim, and an impervious covering inclosing the tread band and all of the series of coils, to prevent moisture, stones, dirt or other obstacles entering the tire, the whole device being arranged as hereinafter more fully set forth and more particularly pointed out in the claims.

Figure 1:
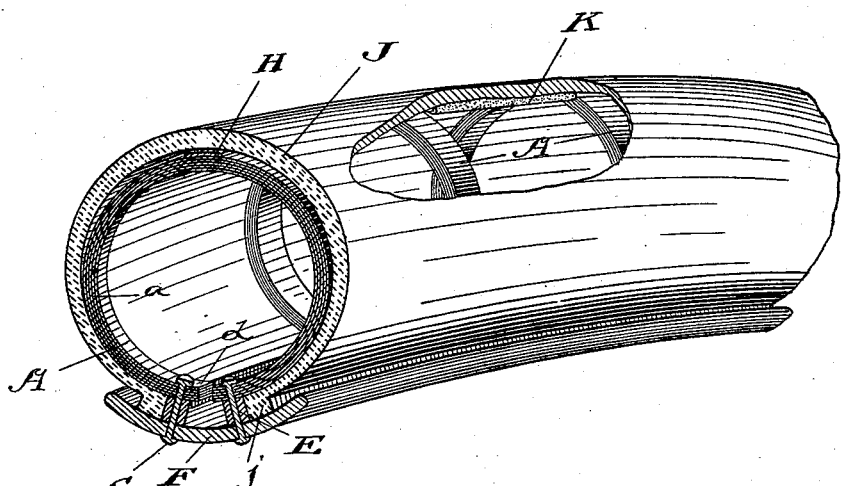
Figure 3:
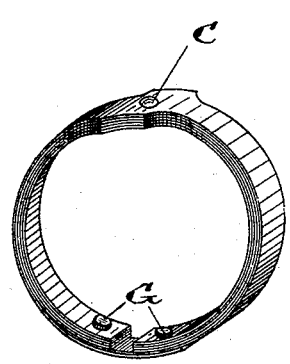
Figure 2:
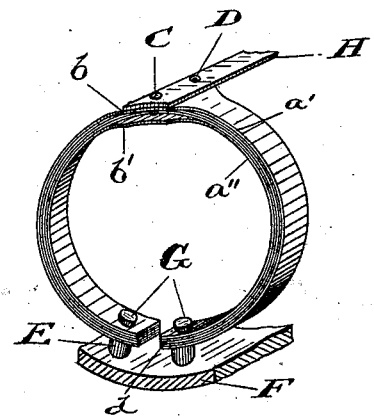

In the drawings: Figure 1 is a perspective view showing a section of the rim and tire. Fig. 2 is a perspective view of one of the spring coils and a section of the tread band. Fig. 3 is a modification of Fig. 2.

Like letters of reference refer to like parts throughout the specification and drawings.

Arranged around the rim is a series of detached independent coils A of flat spring steel. Each of the coils A might consist of one thickness of spring metal of sufficient strength to answer the purpose, but I prefer to use instead of one thickness of metal several thicknesses or leaves *a* arranged in the form of a coil, as I find the thinner the metal is the farther it will bend without breaking or setting, and that by using several thicknesses of thin spring metal the required flexibility and resiliency are obtained together with the required strength. Another advantage in using a coil comprised of a series of thicknesses or leaves is in the event of one or more thicknesses or leaves of the coil breaking through unusual violence the injured thicknesses or leaves may be removed and replaced by others of the same dimensions.

It will be noticed that the outer thickness or leaf $a'$ and the inner thickness or leaf $a''$ of each of the coils A at a point diametrically opposite the rim are provided respectively with flanges $b-b'$ which extend outwardly from the sides of the said thicknesses or leaves. Passing through the flanges $b-b'$ at one side of each of the coils is a rivet C which bears against the adjacent side of the intermediate thicknesses or leaves $a$, and passing through the flanges $b-b'$ on the opposite sides of each of the coils is a similar rivet D which bears against the adjacent side of the intermediate thicknesses or leaves $a$. By means of the rivets C—D passing through the flanges $b-b'$ the several thicknesses or leaves are held laterally together at the tread of the coils.

It might here be stated that each of the coils A diametrically opposite the middle of the tread is preferably formed with a space intervening between the ends of the coil and that each end of each of the coils A is mounted on a pedestal E fastened to the rim F, and that the pedestals are located one on each side of the middle of the rim. Passing through the rim F and each pedestal E and the respective end $d$ of the coil A is a rivet G which rigidly fastens the respective end of the coil A to the respective pedestal E and at the same time fastens the pedestal to the rim. By means of the rivets G and the rivets C—D the several thicknesses of the coil are secured concentrically together and the coil is secured to the rim. Secured to the outer side of each of the coils A at a point diametrically opposite the rim F is the tread band H which is fastened to each of the coils A.

To avoid using any more material than I find it absolutely necessary I find it advisable to continue the rivets C—D through the tread bands H.

By placing the coils A on pedestals E the coils A will not come in contact with the rim at any period under any ordinary compression, and thus each of the coils A will be permitted to have an independent side compression and the tire will have all the buoyancy and flexibility and resiliency attributed to a highly inflated pneumatic tire.

In Fig. 3 I have shown a modification of the coil. In this instance the coil consists of a series of thicknesses or leaves of spring steel which are connected together by a rivet C passing through the middle of each and all of the thicknesses or leaves at the outer extremity of the diameter of the coil. In order to compensate for the weakness resulting from the rivets passing through the various thicknesses or leaves of the coil I find it advisable to increase the width of each of the thicknesses or leaves at that part where the rivet passes through so that the coil will have sufficient strength to resist any breaking tendency at that point. Where only one rivet is employed to secure together the several leaves the tendency of the coil will be to turn from side to side on the rivet C which would act as a pivot, and to counteract that tendency the ends of the outer leaves are overlapped and the rivets C pass through the rim, pedestals, and overlapping ends.

Inclosing the series of coils A is a rubber cover J which is thickened at the tread for ease of running. Cemented or otherwise fastened to the tread band H at regular intervals is a series of pieces of cloth or rubber K, and cemented to the cloth or rubber pieces K is the inner side of the outer cover J.

One advantage of using the pedestals is that sufficient space is left between the coils and the rim to allow of the edges *j* of the outer cover J, which are thickened, being crowded in between the coils A and the rim F, which space they completely fill up around the rim. If it is deemed necessary the edges of the outer cover may also be cemented to the rim so that the outer cover may be securely fastened to the tire and to the rim of the wheel to further prevent the entrance of moisture or foreign obstacles to the tire. This outer cover J is of sufficient dimensions to snugly fit the parts which it is intended to cover. Instead of securing the cover in the manner just described its edges may be brought round the inside of the rim and cemented together.

The object of securing the tread band to the outer side of the coils is to hold each and all of the coils in proper position laterally, to unite the several coils so that the compression on one or more of the coils will be distributed over the remaining coils, and also to prevent the displacement of one or more of the coils. A tire constructed on this principle can be easily and cheaply manufactured. By constructing each coil of a series of leaves the number of leaves may be varied according to the load intended to be carried by the wheel.

Having thus fully described my invention, what I claim as new, and desire to secure by Letters Patent, is—

1. A tire for wheels consisting of a series of annular metallic springs, a pedestal for each spring of the series located between the spring and the rim of the wheel, substantially as specified.

2. A tire for a wheel consisting of a series of annular metallic springs, a pedestal for each spring of the series located between the spring and the rim of the wheel, and a tread band connecting together all of the series of springs, substantially as specified.

3. In a wheel the combination of the rim, a tire for the wheel consisting of a series of detached independent annular springs, a pedestal for each of the springs located between its respective spring and the rim of the wheel, a tread band connected to each spring of the series, and an impervious covering for the tire, substantially as specified.

4. In a wheel the combination of the rim, a series of detached independent annular springs arranged at regular intervals around the rim, the ends of each spring separated from each other, each end of each spring mounted on a pedestal located between the spring and the rim, substantially as specified.

5. In a wheel the combination of the rim, a series of detached independent annular springs arranged at regular intervals around the rim, the ends of each spring separated from each other, each end of each spring mounted on a pedestal located between the spring and the rim, and a tread band connected to each of the series of springs, substantially as specified.

6. In a wheel the combination of the rim, a series of detached independent annular springs arranged at regular intervals around the rim, the ends of each spring separated from each other, each end of each spring mounted on a pedestal located between the spring and the rim, a tread band connected to each of the series of springs, and an impervious covering for the tire, substantially as specified.

7. A tire for a wheel consisting of a series of detached independent annular springs, each spring comprised of a series of leaves the innermost leaf and the outermost leaf having enlargements or flanges at the sides of the spring, rivets passing through the flanges of the said leaves on each side of the spring and bearing against the intermediate leaves, and a pedestal in which each spring is mounted, substantially as specified.

8. In a wheel the combination of the rim, a tire comprised of a series of detached independent annular springs, each spring consisting of a series of independent leaves the ends of which are separated, each end of each spring mounted on and riveted to a pedestal fastened to the rim, and a rivet passing through each spring substantially diametrically opposite the pedestal, substantially as specified.

9. In a wheel the combination of the rim, a tire comprised of a series of detached independent annular springs, each spring consisting of a series of independent leaves the ends of which are separated, each end of each spring mounted on and riveted to a pedestal fastened to the rim, a rivet passing through each spring substantially diametrically opposite the pedestal, and an impervious covering for the tire substantially as specified.

10. In a wheel the combination of the rim, a tire consisting of a series of detached independent annular springs each spring consisting of a series of leaves the inner leaf and the outer leaf provided with a flange extending beyond each side of the coil, rivets passing through the said flanges on each side of the spring and bearing against the intermediate leaves, each end of each spring riveted to a pedestal fastened to the rim, and an impervious covering inclosing the tire, substantially as specified.

11. A tire for a wheel consisting of a series of detached independent annular springs, each spring comprised of a series of leaves the innermost leaf and the outermost leaf having enlargements or flanges at the sides of the spring, rivets passing through the flanges of the said leaves on each side of the spring and bearing against the intermediate leaves, a pedestal in which each spring is mounted, and a tread band connected to each spring of the series, substantially as specified.

12. In a wheel the combination of the rim, a tire comprised of a series of detached independent annular springs, each spring consisting of a series of independent leaves the ends of which are separated, each end of each spring mounted on and riveted to a pedestal fastened to the rim, a rivet passing through each spring substantially diametrically opposite the pedestal, and a tread band connected to each spring of the series, substantially as specified.

Toronto, October 20, 1894.

E. E. HORTON.

In presence of—
C. H. RICHES,
M. A. WESTWOOD.